United States Patent [19]

Strate

[11] 3,812,917
[45] May 28, 1974

[54] POWER EDGER ATTACHMENT FOR TRACTOR

[76] Inventor: Lowell D. Strate, 1340 Greenview Dr., La Habra, Calif. 90631

[22] Filed: May 26, 1972

[21] Appl. No.: 257,316

[52] U.S. Cl.................. 172/15, 56/11.6, 56/17.1, 56/256
[51] Int. Cl.................. A01d 35/00, A01d 55/18
[58] Field of Search.................. 172/13–15; 56/11.6, 16.9, 17.1, 256

[56] References Cited
UNITED STATES PATENTS

| | | | |
|---|---|---|---|
| 2,663,137 | 12/1953 | Asbury | 56/295 |
| 2,664,807 | 1/1954 | Hedrick | 172/15 |
| 2,676,447 | 4/1954 | Asbury | 56/16.9 |
| 2,706,941 | 4/1955 | Swanson | 172/15 |
| 2,847,813 | 8/1958 | Hanson et al. | 172/15 |
| 3,304,700 | 2/1967 | Barber | 56/13.7 X |
| 3,407,579 | 10/1968 | Decker | 56/256 |
| 3,421,300 | 1/1969 | Rhodes | 172/14 X |
| 3,646,736 | 3/1972 | Hutchins | 56/16.9 |
| 3,710,563 | 1/1973 | Polette et al. | 15/16.9 |

Primary Examiner—Robert E. Pulfrey
Assistant Examiner—Paul T. Sewell

[57] ABSTRACT

A power edger attachment for wheel supported lawn cutting tractors wherein the edger is supported laterally outwardly of the machine and its wheels at one side thereof, the edger wheel or cutter can be adjusted vertically from the driver's seat to permit an edging operation with the tractor traveling on the surface of the lawn being edged and the edger wheel extending below the wheels of the tractor, or with the edger wheel elevated, an edging operation can be performed with the tractor running in a street adjacent a curb with the edger wheel driving mechanism extending above and beyond the top of the curb and the edger wheel being located between the curb and the sod or lawn lying inside of the curb opposite the street side thereof. Also, an edger wheel construction made up of flexible scarifying elements extending from a hub so the machine can be driven over a sidewalk or similar hard surface without damage to the edger wheel and without necessitating elevation of the wheel by the operator of the machine.

1 Claim, 11 Drawing Figures

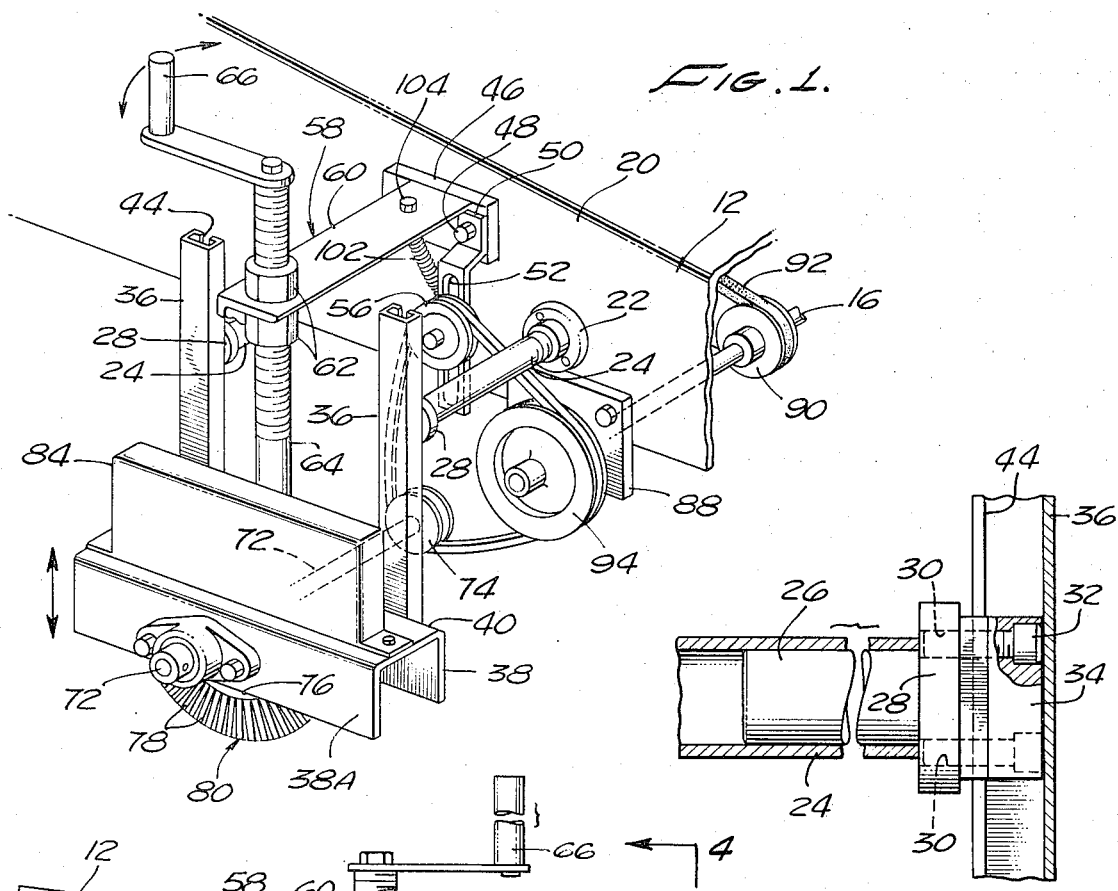
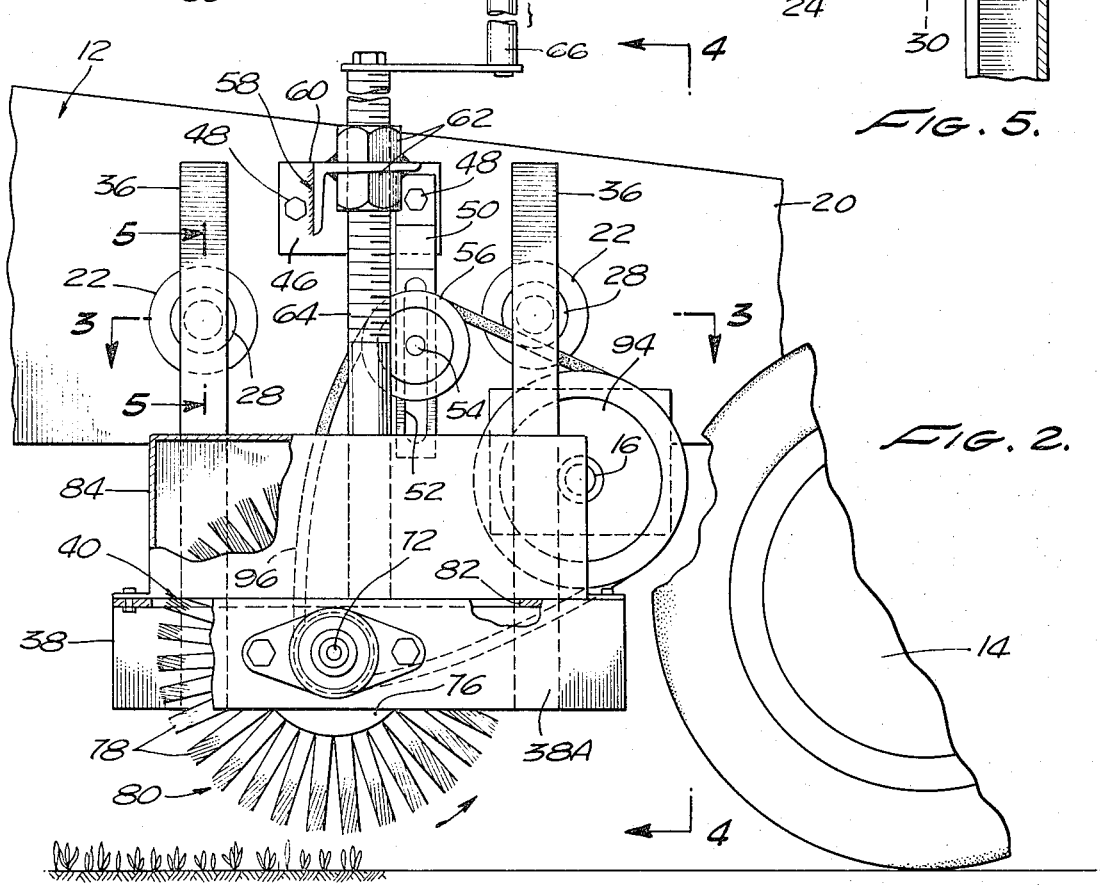

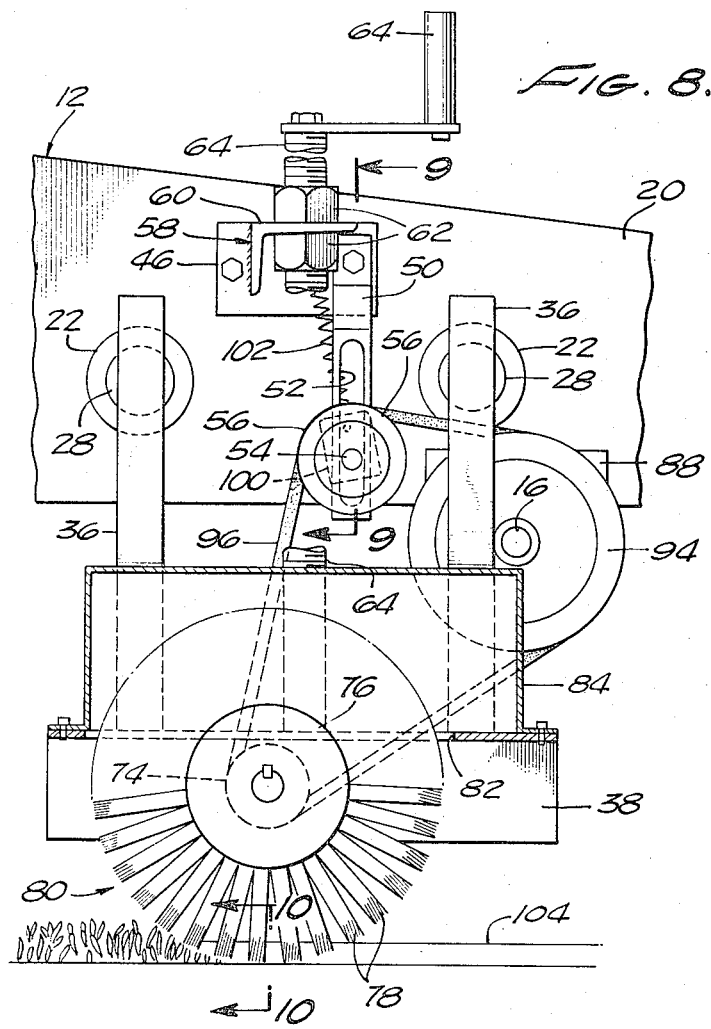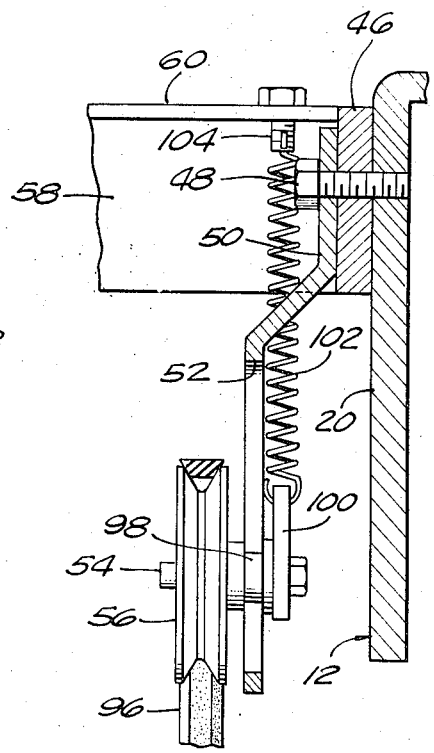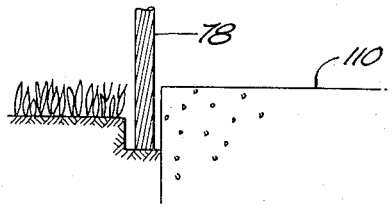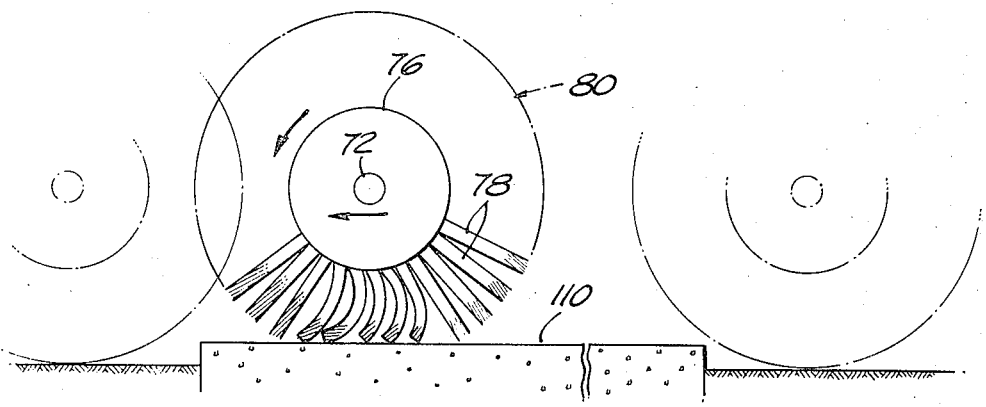

POWER EDGER ATTACHMENT FOR TRACTOR

This invention relates to power lawn mowers and more particularly to such mowers equipped with power driven edgers. It is particularly adaptable for use with such mowers in the form of small tractors which are adapted to carry users.

The general object of the invention is to provide a mower of this type with a laterally disposed edger in the form of a rotary wheel driven from a power shaft on the machine, wherein the edger wheel is conveniently adjustable vertically with respect to the tractor through the manipulation of an elevating device accessible to a hand of the user of the machine when he is seated thereon.

A further object of the invention is to provide a power mower with lawn edger means which permit a plot of lawn or sod to be edged along a curb at the side of a street, the edger being operable with the tractor traveling on the lawn adjacent the curb and the edger wheel positioned at a depth a little below the point of engagement of the tractor wheels in the ground, or where a lawn area along a curb is interrupted by trees, preventing convenient tractor travel on the lawn, the tractor can be operated in the street adjacent the curb and the edger wheel elevated and positioned along the desired line between the inside of the curb and the lawn.

A further object is to provide means for supporting the edger wheel a distance laterally of the wheels at one side of the tractor sufficient to permit the edger wheel support to extend over the curb and the wheel to lie between the curb and the lawn.

Still a further object is to provide a power mower or like machine with a lawn edger wheel having a trimming portion which is flexible so that the edger wheel will not become damaged when coming into contact with hard objects, such as rocks or curbs, and wherein the mower can be driven across a concrete walk or the like without raising the edger wheel and without damage thereto, because of its flexibility.

The above and other objects and advantages of the invention will more fully appear from the following description in connection with the accompanying drawing:

FIG. 1 is a fragmentary perspective view of a portion of a tractor frame with an embodiment of my device thereon;

FIG. 2 is a side elevational view of that portion of the machine generally shown in FIG. 1 with parts broken away and in section, and with a portion of one of the tractor wheels illustrated therewith;

FIG. 5 is an enlarged sectional detail taken approximately on the line 5—5 of FIG. 2;

FIG. 8 is a side elevational view similar to FIG. 2 with the edger wheel lowered from the position of FIG. 2 to a lawn edging position;

FIG. 9 is an enlarged sectional detail taken approximately on line 9—9 of FIG. 8;

FIG. 10 is a sectional detail taken approximately on line 10—10 of FIG. 8;

FIG. 11 is a composite partially diagrammatic side elevational view of the edger wheel in three positions of advancement, illustrating the action of the edger wheel when it crosses an unyielding surface, such as a walk.

Figure 3:
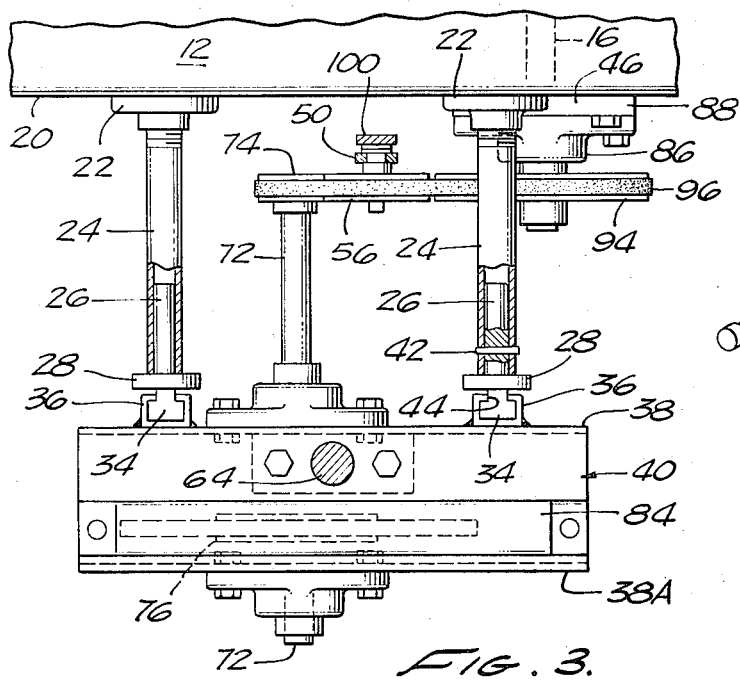
FIG. 3 is a sectional view taken approximately on the line 3—3 of FIG. 2.
Figure 6:
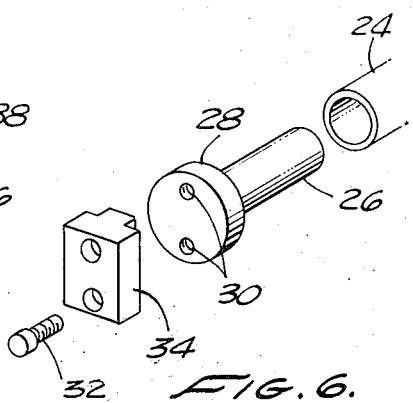
FIG. 6 is an exploded view in perspective of portions of the edger wheel sub-frame supporting means on a scale somewhat larger than that of FIG. 3.
Figure 7:
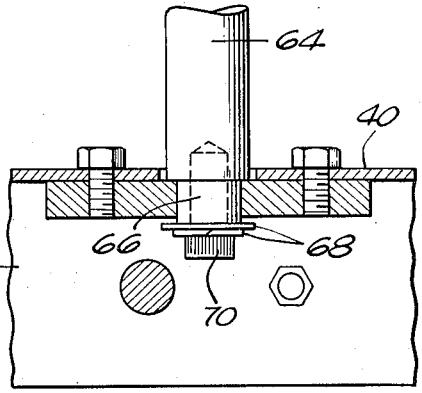
FIG. 7 is an enlarged sectional detail taken approximately on the line 7—7 of FIG. 4.
Figure 4:
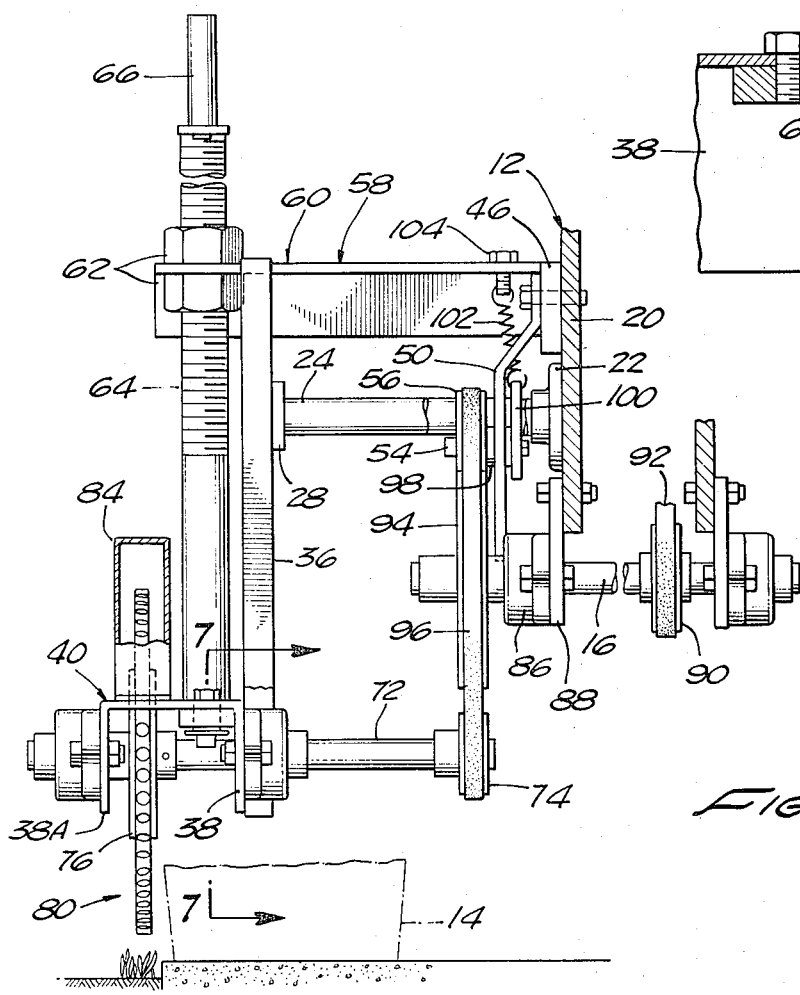
FIG. 4 is a sectional view taken approximately on the line 4—4 of FIG. 2.

In the drawings there is shown a frame 12 which comprises part of a side frame of a tractor chassis conventionally supported by suitable ground wheels, one of which is shown at 14 in FIG. 2. The frame 12 at least partially supports a power shaft 16 having a power pulley 90, said power shaft being conveniently connected to a suitable moving portion of a tractor engine (not shown), such as is commonly used for driving the tractor and operating the mower mechanism.

Secured to the vertical web 20 of the chassis frame member 12 are horizontally spaced pipe flanges 22 into which are threaded pipe sections 24 which extend laterally outwardly from the frame 12. The outer end of each pipe section 24 has inserted therein a piece of bar stock 26 having a flange 28 on its outer end which is larger than the I.D. of the pipe section 24. The flange 28 is provided with threaded sockets 30 to receive threaded bolts 32 which extend through T-heads 34. Said T-heads are adapted to slidably fit channeled guides 36 which are disposed vertically and welded or otherwise suitably secured to the inner web 38 of an inverted U-shaped channel member 40 which constitutes a portion of a sub-frame for the edger wheel to be described. The bar stock 26 as shown in FIG. 3, may be secured conveniently in the pipe section 24 by a suitable pin 42 or by any other convenient means. It should be noted that the flange 28 in addition to being larger than the pipe section 24, also quite amply bridges the slot 44 of each of the guide channels 36.

Mounted on the side web 20 of the frame 12 is a block 46 secured to the frame 12 by a bolt 48 which also secures a bracket 50 extending outwardly and then downwardly and having a slotted portion 52 to slidably receive a stub shaft 54 supporting an idler pulley, to be described further herebelow.

Welded or otherwise suitably secured to the block 46 is an angle member 58 having a horizontal upper web 60 on the upper and lower sides of which are welded nuts 62. Extending through the nuts 62 and a coincident aperture in the web 60, is a threaded bar 64 having an upper handle 66. The threaded bar 64 extends downwardly through the horizontally upper web 40 of the inverted channel 38. The bar 64 has a reduced lower end 66 carrying suitable washers 68 held in place by a stud 70 threaded into the lower end of said bar 64. Thus, when the threaded bar 64 is rotated in one direction or the other, it will travel through the nuts 62, causing the lower end of said threaded bar to raise or lower and to likewise raise or lower the inverted channel 40 constituting part of the edger wheel sub-frame.

A shaft 72 is suitably journalled between the vertical webs 38 and 38A of the inverted channel 40. Said shaft extending inwardly to a point adjacent the side web 20 of the chassis frame 12 and the inner end of said shaft 72 carries a driven pulley 74. Between the channel webs 38 and 38A, an edger wheel hub 76 is mounted on the shaft 72 for rotation therewith. Extending radially from the hub are flexible sod lacerating elements 78 which may conveniently be in the form of braided stiff wire rope, which while stiff, are sufficiently flexible to yield or bend when the elements 78 contact hard objects such as curbs, rocks, sidewalks, or the like. This is a decided advantage over conventional lawn edging discs or elongated rectangular blades which can readily become ruined when they come into contact with such hard objects.

It should be noted that the overall diameter of the edger wheel, indicated in its entirety at 80, is such that the horizontal top web of the inverted channel 40 must be provided with a cutout 82, as shown in FIG. 8. Since the edger wheel extends above the inverted channel 40, I provide a housing 84 which is suitably fastened to the top of said inverted channel and provides a cover or guard for the upper portion of the edger wheel.

The power shaft 16 is mounted in a journal 86 on a plate 88 suitably secured to and extending downwardly from the side flange 20 of the chassis frame 12. Said power shaft 16 is shown with a pulley 90 and a belt 92 by means of which the power shaft can be driven from a power takeoff from the engine utilized to propel the tractor and operate the mower mechanism, the engine and mower mechanisms not being shown herein because they are conventional and well known in the art. The opposite end of the power shaft 16 from the pulley 90 is provided with a larger pulley 94 which is in the same vertical plane with idler pulley 56 and the pulley 74 on the countershaft 72 which rotatingly supports the edger wheel 80. A belt 96 lies about the power pulley 94, the edger wheel drive pulley 74 and the idler pulley 56. The idler pulley was previously described as being supported by the bracket 50. The idler pulley shaft 54 rotates in a bearing block 98 which is slidably mounted in the slot 52 in said bracket 50. A lug 100 is mounted on the inner end of the idler pulley shaft 54. One end of a spring 102 is connected to the lug 100 and the opposite end of said spring is connected under tension to an anchor bolt 104 carried by the top web 60 of the angle iron 58 which supports the threaded elevating bar 64. Thus, the idler pulley 56 is biased upwardly in the slot 52 so that when the edger wheel 80 is elevated along with its sub-frame comprising the inverted channel 40, the idler will be elevated under the influence of the spring 102 and of course the spring will permit the idler pulley to be lowered when tension is applied to the belt 96 as the edger wheel 80 is lowered by the threaded bar 64.

From the foregoing it will be seen that I have provided a tractor particularly adaptable for mowers with a lawn edger which can be raised and lowered to suit different operating conditions and environments. Where the tractor can conveniently travel on the surface of the lawn or sod, the edger wheel 80 can be lowered to a position similar to that shown in FIG. 8, where the flexible elements 78 of the edger wheel extend but a short distance below the surface of the ground and also a short distance below the line 104 of FIG. 8, which might conveniently be considered the horizontal plane of support for the tractor wheels.

There are some conditions however, such as in boulevard areas between sidewalks and adjacent curbs where tree plantings and other obstructions might render it impossible to run the tractor over the surface of the grass adjacent the curb. In such cases, the tractor can be driven in the street on a level an appreciable distance below the top surface of a curb. When the edger wheel 78 is elevated by means of the threaded bar 64 to a point where it is higher than the curb, the tractor can then be driven up adjacent the curb with the edger wheel shaft 72 lying above the curb and the edger wheel itself disposed in a plane adjacent the inner side of the curb and the edge of the grass. Thereupon, the edger wheel can be lowered to a desired cutting distance and the grass can be edged while the tractor moves along in the street side and below the curb.

As pointed out above, the edger wheel 80 is particularly useful in a machine of this type because it can be driven for example, across a sidewalk as illustrated in FIG. 11, the sidewalk itself being indicated at 110. The flexible elements 78 which are of a material which will properly lacerate or edge the sod or lawn, will yield or bend as shown in FIG. 11 so that no damage will be suffered by the edger wheel. It is customary to make edgers with cutters having aligned legs extending radially in opposite directions from the axis of rotation or to provide disc-like cutters with serrated edges. In the case of both of these types when they are run into or over hard objects, such as concrete construction, they are damaged to the point of uselessness. With my edger wheel however, such hard objects can be contacted numerous times without appreciably effecting the cutting ability of the flexible cutting elements.

It should be understood that various changes can be made in the form, details, arrangement and proportions of the various parts without departing from the spirit of the invention.

I claim:

1. In a lawn edging machine, an ambulant main frame having a power device thereon, the improvement comprising: an edger wheel support unit including a sub-frame with an edger wheel shaft and an edger wheel mounted thereon, a drive connection between the power device and the edger wheel shaft, a pair of vertically disposed fore-and-aft channeled guides extending vertically from said sub-frame unit, rigid arms extending from the main frame to each of said guides and having guide followers fitting in said guides and relative to which the guides and sub-frame unit are vertically movable, a bracket extending from said main frame having an outer end portion disposed substantially midway between said guides, a vertical screw shaft threaded through the outer end of said bracket with its lower end swiveled to said sub-frame unit, and crank means on the upper end of the screw shaft.

* * * * *